US011560175B2

(12) United States Patent
Audino et al.

(10) Patent No.: US 11,560,175 B2
(45) Date of Patent: Jan. 24, 2023

(54) OPERATOR ACTION POSITIONING MODULE FOR LANE ASSISTANCE FUNCTION

(71) Applicant: STEERING SOLUTIONS IP HOLDING CORPORATION, Saginaw, MI (US)

(72) Inventors: Eduardo Audino, Oise (FR); Naji Kfoury, Oise (FR)

(73) Assignee: Steering Solutions IP Holding Corporation, Saginaw, MI (US)

( * ) Notice: Subject to any disclaimer, the term of this patent is extended or adjusted under 35 U.S.C. 154(b) by 398 days.

(21) Appl. No.: 16/906,492

(22) Filed: Jun. 19, 2020

(65) Prior Publication Data

US 2021/0394828 A1    Dec. 23, 2021

(51) Int. Cl.
  *B62D 6/08*  (2006.01)
  *B62D 15/02*  (2006.01)
  *G01L 5/22*  (2006.01)
  *B62D 1/06*  (2006.01)

(52) U.S. Cl.
  CPC ............. *B62D 15/025* (2013.01); *B62D 1/06* (2013.01); *B62D 15/022* (2013.01); *G01L 5/221* (2013.01)

(58) Field of Classification Search
  CPC ...... B62D 15/025; B62D 1/06; B62D 15/022; B62D 1/046; B62D 6/007; B62D 6/10; G01L 5/221
  See application file for complete search history.

(56) References Cited

U.S. PATENT DOCUMENTS

| 2014/0379244 | A1 | 12/2014 | Haeussler |
| 2018/0017968 | A1 | 1/2018 | Zhu et al. |
| 2022/0212713 | A1* | 7/2022 | Shin ..................... B62D 15/021 |
| 2022/0219531 | A1* | 7/2022 | Sakuragi ................ B60K 26/02 |

(Continued)

FOREIGN PATENT DOCUMENTS

| CN | 1958373 A | 5/2007 |
| CN | 106394676 A | 2/2017 |

(Continued)

OTHER PUBLICATIONS

Preliminary Search Report and Written Opinion from related French Patent Application No. 19/06717 dated Jun. 3, 2020, 6 pages.

(Continued)

*Primary Examiner* — Toan N Pham
(74) *Attorney, Agent, or Firm* — Dickinson Wright PLLC

(57) ABSTRACT

A blending steering control method includes estimating a handwheel pressure applied by an operator to a handwheel and receiving a handwheel torque input indicating a torque value applied by the operator to the handwheel. The method also includes receiving a target handwheel angle indicating a target handwheel angle of an electronic power steering system configured to control a corresponding vehicle along a defined path. The method also includes generating a scaled operator intent value based on the estimated handwheel pressure and the handwheel torque and generating an output torque value based on the target handwheel angle and scaled operator intent value. The method also includes selectively controlling vehicle trajectory based on the output torque value.

20 Claims, 4 Drawing Sheets

(56) References Cited

U.S. PATENT DOCUMENTS

2022/0227412 A1* 7/2022 Akatsuka ............... B62D 6/008
2022/0242481 A1* 8/2022 Mizoguchi ........... B62D 15/025

FOREIGN PATENT DOCUMENTS

| CN | 107303903 A | 10/2017 |
|----|-------------|---------|
| DE | 102014107194 A1 | 11/2015 |
| DE | 102015109146 A1 | 12/2016 |
| DE | 102017107785 A1 | 10/2017 |
| DE | 102017210299 A1 | 12/2018 |
| DE | 112017004674 T5 | 5/2019 |
| WO | 2018233777 A1 | 12/2018 |

OTHER PUBLICATIONS

Chinese Office Action and Search Report from the Chinese Patent Office for related Chinese Application Serial No. 202010574119.5 dated May 31, 2022, 10 pages.
Official Letter from the German Patent and Trademark Office for related German Application Serial No. 102020116196.4 dated Aug. 5, 2022, 12 pages.

* cited by examiner

OPERATOR ACTION POSITIONING MODULE FOR LANE ASSISTANCE FUNCTION

CROSS-REFERENCES TO RELATED APPLICATIONS

This patent application claims priority to French Patent Application Serial No. 19/06717, filed Jun. 21, 2019, which is incorporated herein by reference in its entirety.

TECHNICAL FIELD

This disclosure generally relates to operator assistance functions and in particular to an operator action position module for lane assistance functions.

BACKGROUND OF THE INVENTION

Vehicles, such as cars, trucks, sport utility vehicles, crossovers, mini-vans, or other suitable vehicles, increasingly include operator assistance features, such as adaptive cruise control features, lane keep features, automatic breaking features, and the like. Additionally, such vehicles typically include an electronic power steering system. The EPS system is typically configured to provide a steering assist to an operator of a corresponding vehicle. For example, the EPS system may be configured to apply an assist torque to an electric motor, which is connected to a steering mechanism. As the operator interacts with a handwheel or steering wheel associated with the steering mechanism, the amount of force or torque applied by the operator on the handwheel or steering wheel is assisted (e.g., reducing amount of force or torque required by the operator to perform a corresponding steering maneuver) by the electric motor.

Such EPS systems may provide operator assistance functions using one or more actuators to help or guide a vehicle within a defined path or trajectory. The trajectory is translated into a sequence of inputs to an actuator to steer the vehicle following a target path. The inputs may include a sequence of target angles, an operator torque offset or other vehicle variables to be applied to the one or more actuators of the EPS system.

SUMMARY

This disclosure relates generally to electronic power steering systems.

An aspect of the disclosed embodiments includes a method for blending control of a steering assist system. The method determines operator intent by analyzing one or more signals and determines a vehicle trajectory by using one or more signals. A control module is used to merge the operator intent with the vehicle trajectory and merges control of the vehicle between operator intent and vehicle trajectory.

Another aspect of the disclosed embodiments includes a method for blending control of a steering assist system. The method determines operator intent by analyzing one or more signals and determines a vehicle trajectory by using one or more signals. A control module is used to merge the operator intent with the vehicle trajectory and merges control of the vehicle between operator intent and vehicle trajectory.

Another aspect of the disclosed embodiments includes a blending steering control method. The method includes estimating a handwheel pressure applied by an operator to a handwheel and receiving a handwheel torque input indicating a torque value applied by the operator to the handwheel. The method also includes receiving a target handwheel angle indicating a target handwheel angle of an electronic power steering system configured to control a corresponding vehicle along a defined path. The method also includes generating a scaled operator intent value based on the estimated handwheel pressure and the handwheel torque and generating an output torque value based on the target handwheel angle and scaled operator intent value. The method also includes selectively controlling vehicle trajectory based on the output torque value.

Another aspect of the disclosed embodiments includes a blending steering control system. The system includes a processor and a memory. The memory includes instructions that, when executed by the processor, cause the processor to: estimate a handwheel pressure applied by an operator to a handwheel; receive a handwheel torque input indicating a torque value applied by the operator to the handwheel; receive a target handwheel angle indicating a target handwheel angle of an electronic power steering system configured to control a corresponding vehicle along a defined path; generate a scaled operator intent value based on the estimated handwheel pressure and the handwheel torque; generate an output torque value based on the target handwheel angle and scaled operator intent value; and selectively control vehicle trajectory based on the output torque value.

Another aspect of the disclosed embodiments includes an apparatus that includes a processor and a memory. The memory includes instructions that, when executed by the processor, cause the processor to: estimate a handwheel pressure applied by an operator to a handwheel; receive a handwheel torque input indicating a torque value applied by the operator to the handwheel; generate a scaled handwheel torque based on a first scaling factor and the handwheel torque; generate a scaled estimated handwheel pressure based on a second scaling factor and the estimated handwheel pressure; receive a target handwheel angle indicating a target handwheel angle of an electronic power steering system configured to control a corresponding vehicle along a defined path; generate a scaled operator intent value based on the scaled estimated handwheel pressure and the scaled handwheel torque; generate an output torque value based on the target handwheel angle and scaled operator intent value; and selectively control vehicle trajectory based on the output torque value.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
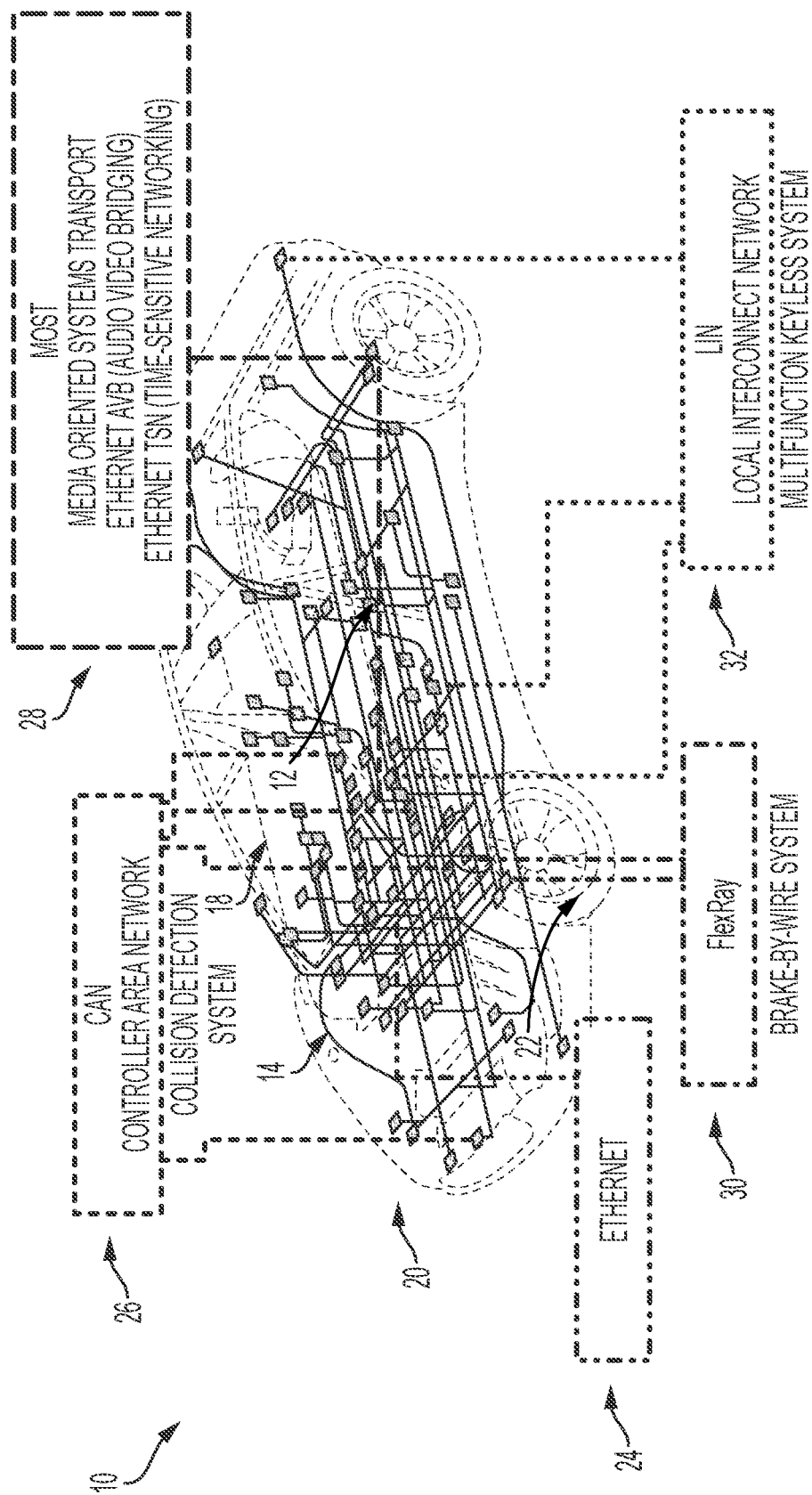
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, or other suitable vehicles, increasingly include operator assistance features, such as adaptive cruise control features, lane keep features, automatic breaking features, and the like. Additionally, such vehicles typically include an electronic power steering system. The EPS system is typically configured to provide a steering assist to an operator of a corresponding vehicle. For example, the EPS system may be configured to apply an assist torque to an electric motor, which is connected to a steering mechanism. As the operator interacts with a handwheel or steering wheel associated with the steering mechanism, the amount of force or torque applied by the operator on the handwheel or steering wheel is assisted (e.g., reducing amount of force or torque required by the operator to perform a corresponding steering maneuver) by the electric motor.

Such EPS systems may provide operator assistance functions using one or more actuators to help or guide a vehicle within a defined path or trajectory. The trajectory is translated into a sequence of inputs to an actuator to steer the vehicle following a target path. The inputs may include a sequence of target angles, an operator torque offset or other vehicle variables to be applied to the one or more actuators of the EPS system.

While the EPS system is controlling the trajectory of the vehicle, the operator may not provide control input using the handwheel. However, the operator may desire to engage the handwheel to take control of the trajectory of the vehicle. Such typical EPS systems do not provide for integrating the operator intent or action into the inputs of the actuator.

Accordingly, systems and methods, such as those described herein, that provide the ability for integrating the operator intent prior to input into target handwheel angle control loop, may be desirable. In some embodiments, the systems and methods described herein may be configured to provide a natural steering feel perception to the operator without such operator assistance, while intuitive to operator intention.

In some embodiments, the systems and methods described herein may be configured to use set of scalars tables based on the internal computing of hands on wheel detection based on hands pressure on the handwheel. The systems and methods described herein may be configured to use a second set of scalars based on operator torque. The systems and methods described herein may be configured to apply the first set of scalars and the second set of scalars to a difference between input target handwheel angle from lane assistance function and actual handwheel angle, which is an input to position control loop, reducing its magnitude in proportion to the driver deviation intent.

In some embodiments, the systems and methods described herein may be configured to provide an integral gain anti-winding limit to saturate the output torque action at the moment path deviation by the operator is performed to reduce the trajectory performance (e.g., particular while controlling the vehicle on a curve).

In some embodiments, the systems and methods described herein may be configured to initiate a blended control procedure in response to the hand pressure on the handwheel, which may allow path deviation to avoid resisting the operator. The operator torque increase occurs as the operator indicates intent is to deviate from the trajectory of the EPS system. The systems and methods described herein may be configured to use the sets of scalars to degrade the control loop performance to follow path while the operator is actively controlling the vehicle.

In some embodiments, the systems and methods described herein may be configured to allow the operator to deviate intentionally, for example, from an obstacle on the trajectory path, while still being guided by an active lane positioning assistance. The systems and methods described herein may be configured to smoothly manage the lane assistance activation and deactivation on a roundabout, for example, by transitioning to a level of effort similar to without lane assistance.

In some embodiments, the systems and methods described herein may be configured to estimate a handwheel pressure applied by an operator to a handwheel. The systems and methods described herein may be configured to receive a handwheel angle indicating a torque value applied by the operator to the handwheel. The systems and methods described herein may be configured to receive a target handwheel angle indicating a target handwheel angle of an electronic power steering system configured to control a corresponding vehicle along a defined path. The systems and methods described herein may be configured to generate a scaled operator intent value based on the estimated handwheel pressure and the handwheel angle. The systems and methods described herein may be configured to generate an output torque value based on the target handwheel angle and scaled operator intent value. The systems and methods described herein may be configured to selectively control vehicle trajectory based on the output torque value.

In some embodiments, the systems and methods described herein may be configured to generate the output torque value using a proportional integral derivative control loop. In some embodiments, a difference between the output torque value and a torque value corresponding to the target handwheel angle increases as a difference between the target handwheel angle and the handwheel angle increases. In some embodiments, a difference between the output torque value and a torque value corresponding to the target handwheel angle increases as the estimated handwheel pressure increases.

In some embodiments, the systems and methods described herein may be configured to limit the scaled operator intent value by limiting an integral term of the scaled operator intent value. In some embodiments, the systems and methods described herein may be configured to generate the scaled operator intent further based on vehicle trajectory information. In some embodiments, the vehicle trajectory information includes at least one of a measured angle, a torque value, and a yaw value.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

The vehicle 10 may include an electronic power steering (EPS) system. The EPS system may include an EPS controller area network (CAN) bus. The EPS CAN bus may be in communication with a vehicle CAN bus of the vehicle 10. The vehicle CAN bus may include features similar to those of the CAN bus 26 or other suitable features. The vehicle CAN bus may communicate with various sensors within the vehicle 10 and receive various measurements from the various sensors. For example, the one or more sensors of the vehicle 10 may measure vehicle speed of the vehicle 10, vehicle yaw rate of the vehicle 10, handwheel or steering wheel angle of the vehicle 10, road wheel angle of the vehicle 10, other suitable measurements, or a combination thereof. The vehicle CAN bus may receive, from a controller of the vehicle 10, one or more signals indicating the various measurements. For example the vehicle CAN bus may receive a vehicle speed signal indicating a measured vehicle speed of the vehicle 10. The vehicle CAN bus may communicate the one or more signals to the EPS CAN bus. The EPS CAN bus may communicate the one or more signals to the ESP controller.

Figure 2:
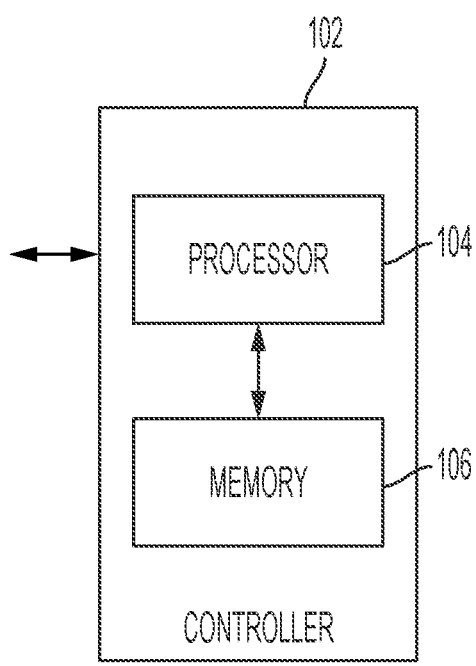
FIG. 2 generally illustrates a controller according to the principles of the present disclosure.
Figure 3:
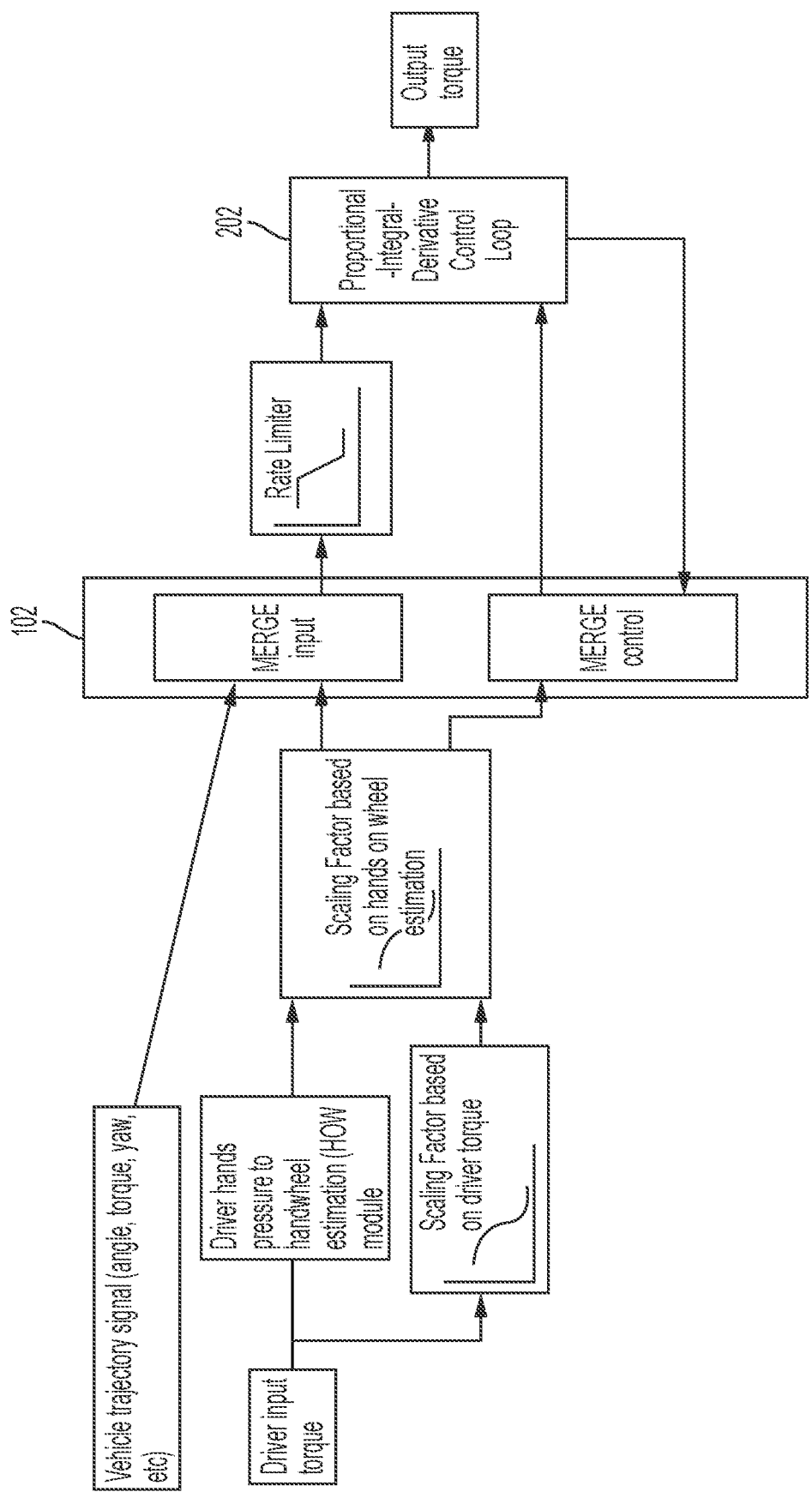
FIG. 3 generally illustrates a block diagram of a system according to the principles of the present disclosure.

The EPS system may be configured to assist and/or control steering of the vehicle 10. The EPS system may include or be in communication with various sensors configured to measure various aspects of the steering system of the vehicle 10. The EPS system may include one or more controller, such as an EPS microcontroller unit (MCU), herein after referred to as the controller 102, as is generally illustrated in FIGS. 2 and 3. The controller 102 may include a processor 104 and associated memory 106. The processor 104 may include any suitable processor, such as those described herein. The memory 106 may comprise a single disk or a plurality of disks (e.g., hard drives), and includes a storage management module that manages one or more partitions within the memory 106. In some embodiments, memory 106 may include flash memory, semiconductor (solid state) memory or the like. The memory 106 may include Random Access Memory (RAM), a Read-Only Memory (ROM), or a combination thereof. The memory 106 may include instructions that, when executed by the processor 104, cause the processor 104 to, at least, provide blended vehicle control to the vehicle 10. The controller 102 may include any suitable number of processors and/or memory in addition to those described herein. It should be understood that the EPS system may include any suitable number of controllers, processors, and memory.

The controller 102 may determine various values corresponding to the one or more signals. For example, the controller 102 may receive a vehicle speed signal (e.g., a first vehicle speed signal) and may determine a vehicle speed value (e.g., a first vehicle speed) based on the vehicle speed signal. The controller 102 may determine one or more assist torque values based on the various values determined from the one or more signals. The one or more assist torque values may correspond to an amount of torque to be provided to an EPS motor. The controller 102 may selectively control the EPS motor using the one or more assist torque values. The EPS motor may be in communication with the steering system, such as a steer-by-wire system or other suitable steering system of the vehicle 10. The EPS motor, when controlled according to the one or more assist torque values, provides a steering assist to steering components of the steering system of the vehicle 10. The steering assist may reduce an amount of torque or force required by the operator of the vehicle 10 to execute a corresponding steering maneuver.

In some embodiments, the controller 102 may be configured to blend the intent of the operator to control the vehicle 10 with the assistance provided by the EPS system. For example, the controller 102 may receive an estimate a handwheel pressure applied by an operator to the handwheel of the vehicle 10. The controller 102 may apply a first set of scalars to the estimated handwheel pressure to generate a scaled estimated handwheel pressure.

The controller 102 may be receive a handwheel torque input (e.g., which may be referred to as a handwheel angle or handwheel torque) indicating a torque value applied by the operator to the handwheel. The controller 102 may apply a second set of scalars to the handwheel torque to generate a scaled handwheel torque. The controller 102 receive a target handwheel angle indicating a target handwheel angle of the EPS system. The target handwheel angle may correspond to an amount of torque the EPS system may use to control trajectory of the vehicle 10.

The controller 102 may generate a scaled operator intent value based on the scaled estimated handwheel pressure, scaled the handwheel torque, vehicle trajectory information, of a combination thereof. The vehicle trajectory information includes a measured angle, a torque value, a yaw value, other suitable vehicle trajectory information, or a combination thereof.

The controller 102 may generate an output torque value based on the target handwheel angle and scaled operator intent value. In some embodiments, the controller 102 may generate the output torque value using a proportional integral derivative control loop. In some embodiments, a difference between the output torque value and a torque value corresponding to the target handwheel angle increases as a difference between the target handwheel angle and the scaled handwheel torque increases. Similarly, the difference between the output torque value and a torque value corresponding to the target handwheel angle increases as the scaled estimated handwheel pressure increases.

In some embodiments, the controller 102 may limit the scaled operator intent value by limiting an integral term of the scaled operator intent value. The controller 102 may selectively control vehicle trajectory of the vehicle 10 based on the output torque value.

With references to FIG. 3, a proportional-integral-derivative control loop mechanism 202 may used by an actuator of the EPS system to follow an intended target path of the ESP system (e.g., to control the vehicle 10 along the intended path). As described, the operator of the vehicle 10 may attempt to take control may gripping the handwheel of the vehicle 10. The operator is given the possibility to adjust the position of the vehicle 10 within the road, by providing a controlled angle variation, under a torque limit and creating a yaw rate variation. Accordingly, the controller 102 may limit the intrusiveness of such assistance function to the operator effort on the handwheel in a controlled manner (e.g., to limit the perception to the operator that there is assistance being provided by the EPS system). Additionally, or alternatively, the controller 102 may be configured to allow the operator to execute adjustments or intended deviations of the original target path, to set a new position within a lane of travel of the vehicle 10.

In some embodiments, the controller 102 may be configured to integrate the operator intent or action into the inputs of the actuator, while maintaining a regular steering feel perception by the operator. The controller 102 may integrate the operator intent into the inputs of the actuator without such operator assistance and while being intuitive to operator intention. The controller 102 may integrate the operator intent to intentionally degrade the target path of the operator assistance function by the EPS system, in order to reduce intrusiveness to operator effort perception at the handwheel of the vehicle 10 (e.g., and to allow the operator to intentionally adjust or deviate from original target path). The controller 102 may be configured to integrate the operator intent with the inputs to the actuator while maintaining a calibratable condition for a vehicle automated assistance operator system (ADAS) controller to understand the new desired vehicle position set by operator.

As is illustrated in FIG. 3, the interpretation of the operator intention is separated into two sections, both linked to an existing sensor measuring operator input torque. The two sections include a level of hand pressure the operator applies to the handwheel and a level of effort at the handwheel (e.g., operator input torque). When either expressing intention to adjust or deviate from the operator assistance target path, while being guided by an operator assistance function, which is actively steering the vehicle, the operator may relax the pressure on handwheel to allow its movement or adjust operator torque on the handwheel. Additionally, or alternatively, the operator gripping the handwheel relatively tightly, may indicate the desire to feel a softened actuator force for more comfort and intuitive driving feedback.

In some embodiments, the actuator force, may be degraded to reduce intrusiveness to operator effort perception. When gripping the handwheel, or initiating an intended movement, the level of hand pressure the operator applies may be detected by using any suitable technique. An active operator action on the handwheel may generate an effort variation at an operator torque sensing device. Furthermore, if the operator input torque into steering increases, this controller 102 may modulate the intended control path to balance the actuator force towards an operator intended new path. The controller 102 may analyze the level of hand pressure applied to the handwheel and the variation of operator torque. Such information is converted into a weight factor multiplier to the path actuator.

In some embodiments, the information may be configured into the weight factor multiplier by considering the main input to define the intended trajectory to the control loop. For example, in response to a target angle, torque, or vehicle variable such as yaw rate, the controller 102 may proportionally scale down the input signal by reducing the difference between an actual path definition variable value and a targeted value, multiplying the difference by a calibratable factor proportional to operator hand pressure on handwheel and by a factor proportional to operator torque.

As the vehicle path is deviated, the integrator of the control loop 202 may increase and counteract the operator intended adjustment or deviating. The controller 102 may multiply the saturation of the integrator term of the control loop 202 by a reduction factor proportional to operator hand pressure on the handwheel and operator torque. In order to control the variation caused by such multiplying factors, the controller 102 may apply a rate limiter proportional to vehicle average speed.

In some embodiments, the controller 102 provides high flexibility of calibrating the proportional-integral-derivative control loop 202, as the control loop 202 may be focused to follow the target path, and not integrate the operator intention into the control loop 202 calibration process (e.g., resulting in greater trajectory precision, reduced response delay, and lower static angular error). The controller 102 may automatically adjust the inputs and action of the control loop 202 in a natural and intuitive manner as perceived by the operator (e.g., such that the operator perception is close to a normal operating condition, without an operator assistance function, but with a controlled and calibratable added effort to help guiding the operator). This natural and intuitive feeling is related to the methodology of linking the action to a natural human behavior of holding the handwheel tighter, when the operator takes more control of the steering and as well as building up steering torque. The controller 102 may determine the operator intention, from operator actions which may either be to simply hold the handwheel tighter (such as analyzing grip force) and/or to adjust or even deviate from the original path. The controller 102 may perform the two steps of analyzing torque sensor data, first by its frequency range or variation to estimate the hand pressure applied to handwheel and second by the actual torque applied as steering input. The controller 102 may then apply such information to scale down the main input variable to control loop 202 to follow the intended trajectory, and in parallel to the integral term.

In some embodiments, the controller 102 may perform the methods described herein. However, the methods described herein as performed by the controller 102 are not meant to be limiting, and any type of software executed on a controller can perform the methods described herein without departing from the scope of this disclosure. For example, a controller, such as a processor executing software within a computing device, can perform the methods described herein.

Figure 4:
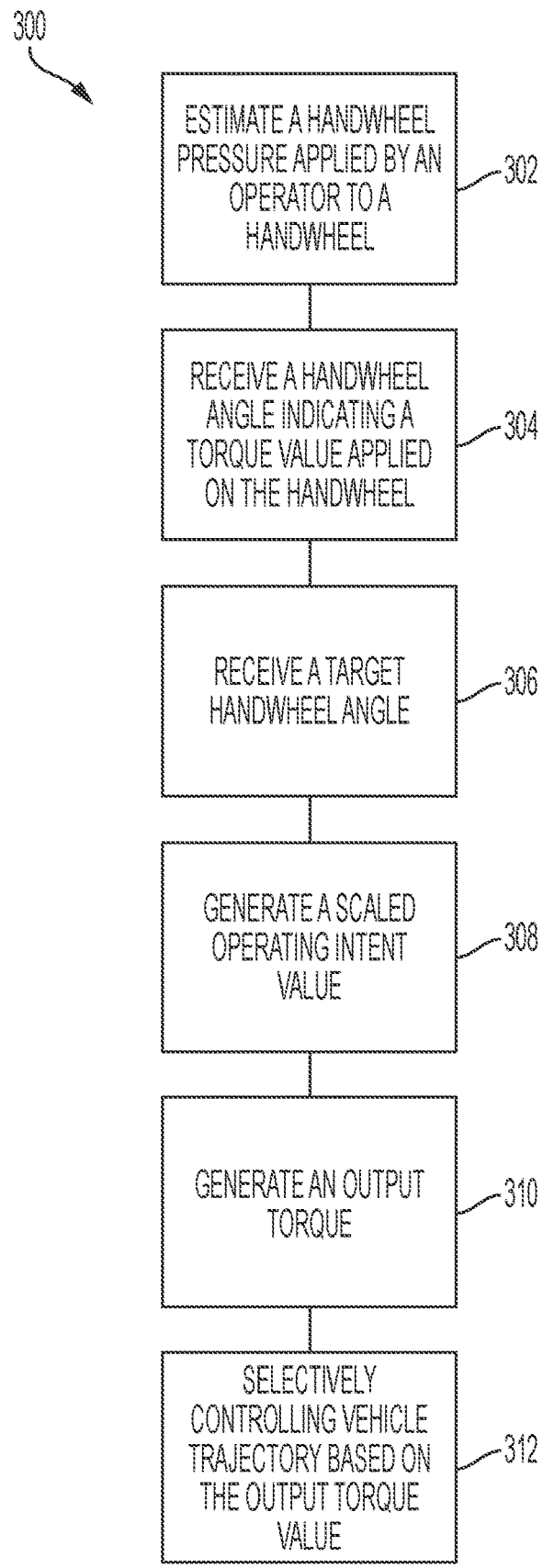
FIG. 4 is a flow diagram generally illustrating a method according to the principles of the present disclosure.

FIG. 4 is a flow diagram generally illustrating a stray magnetic field cancellation method 300 according to the principles of the present disclosure. At 302, the method 300 estimates a handwheel pressure applied by an operator to a handwheel. For example, the controller 102 estimates the handwheel pressure applied by the operator of the handwheel of vehicle 10.

At 304, the method 300 receives a handwheel torque input indicating a torque value applied by the operator to the handwheel. For example, the controller 102 receives the handwheel angle indicating the torque value applied by the operator on the handwheel of the vehicle 10.

At 306, the method 300 receives a target handwheel angle indicating a target handwheel angle of an electronic power steering system configured to control a corresponding vehicle along a defined path. For example, the controller 102 receives the target handwheel angle indicating the target handwheel angle of the EPS system of the vehicle 10.

At 308, the method 300 generates a scaled operator intent value based on the estimated handwheel pressure and the handwheel torque. For example, the controller 102 generates the scaled operator intent value using the scaled estimated handwheel pressure and the scaled handwheel torque. The controller 102 may limit the integral term of the scaled output intent value, as described.

At 310, the method 300 generates an output torque value based on the target handwheel angle and scaled operator intent value. For example, the controller 102 generates the output torque value based on the target handwheel angle and the scaled operator intent value.

At 312, the method 300 selectively controls vehicle trajectory based on the output torque value. For example, the controller 102 uses the output torque value to selectively control the trajectory of the vehicle 10.

In some embodiments, a blending steering control method includes estimating a handwheel pressure applied by an operator to a handwheel and receiving a handwheel torque input indicating a torque value applied by the operator to the handwheel. The method also includes receiving a target handwheel angle indicating a target handwheel angle of an electronic power steering system configured to control a corresponding vehicle along a defined path. The method also includes generating a scaled operator intent value based on the estimated handwheel pressure and the handwheel torque and generating an output torque value based on the target handwheel angle and scaled operator intent value. The method also includes selectively controlling vehicle trajectory based on the output torque value.

In some embodiments, generating the output torque value based on the target handwheel angle and scaled operator intent value, includes generating the output torque value using a proportional integral derivative control loop. In some embodiments, a difference between the output torque value and a torque value corresponding to the target handwheel angle increases as a difference between the target handwheel angle and the handwheel torque increases. In some embodiments, a difference between the output torque value and a torque value corresponding to the target handwheel angle increases as the estimated handwheel pressure increases. In some embodiments, the method also includes limiting the scaled operator intent value. In some embodiments, limiting the scaled operator intent value includes limiting an integral term of the scaled operator intent value. In some embodiments, generating the scaled operator intent is further based on vehicle trajectory information. In some embodiments, the vehicle trajectory information includes at least one of a measured angle, a torque value, and a yaw value.

In some embodiments, a blending steering control system includes a processor and a memory. The memory includes instructions that, when executed by the processor, cause the processor to: estimate a handwheel pressure applied by an operator to a handwheel; receive a handwheel torque input indicating a torque value applied by the operator to the handwheel; receive a target handwheel angle indicating a target handwheel angle of an electronic power steering system configured to control a corresponding vehicle along a defined path; generate a scaled operator intent value based on the estimated handwheel pressure and the handwheel torque; generate an output torque value based on the target handwheel angle and scaled operator intent value; and selectively control vehicle trajectory based on the output torque value.

In some embodiments, the instructions further cause the processor to generate the output torque value using a proportional integral derivative control loop. In some embodiments, a difference between the output torque value and a torque value corresponding to the target handwheel angle increases as a difference between the target handwheel angle and the handwheel torque increases. In some embodiments, a difference between the output torque value and a torque value corresponding to the target handwheel angle increases as the estimated handwheel pressure increases. In some embodiments, the instructions further cause the processor to limit the scaled operator intent value. In some embodiments, the instructions further cause the processor to limit the scaled operator intent value by limiting an integral term of the scaled operator intent value. In some embodiments, the instructions further cause the processor to generate the scaled operator intent further based on vehicle trajectory information. In some embodiments, the vehicle trajectory information includes at least one of a measured angle, a torque value, and a yaw value.

In some embodiments, an apparatus includes a processor and a memory. The memory includes instructions that, when executed by the processor, cause the processor to: estimate a handwheel pressure applied by an operator to a handwheel; receive a handwheel torque input indicating a torque value applied by the operator to the handwheel; generate a scaled handwheel torque based on a first scaling factor and the handwheel torque; generate a scaled estimated handwheel pressure based on a second scaling factor and the estimated handwheel pressure; receive a target handwheel angle indicating a target handwheel angle of an electronic power steering system configured to control a corresponding vehicle along a defined path; generate a scaled operator intent value based on the scaled estimated handwheel pressure and the scaled handwheel torque; generate an output torque value based on the target handwheel angle and scaled operator intent value; and selectively control vehicle trajectory based on the output torque value.

In some embodiments, the instructions further cause the processor to generate the output torque value using a proportional integral derivative control loop. In some embodiments, a difference between the output torque value and a torque value corresponding to the target handwheel angle increases as a difference between the target handwheel angle and the scaled handwheel torque increases. In some embodiments, a difference between the output torque value and a torque value corresponding to the target handwheel angle increases as the scaled estimated handwheel pressure increases.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

Having thus described the invention, it is claimed:
1. A blending steering control method comprising:
 estimating a handwheel pressure applied by an operator to a handwheel;
 receiving a handwheel torque input indicating a handwheel torque applied by the operator to the handwheel;
 receiving a target handwheel angle indicating a target handwheel angle of an electronic power steering system configured to control a corresponding vehicle along a defined path;
 generating a scaled operator intent value based on the estimated handwheel pressure and the handwheel torque;
 generating an output torque value based on the target handwheel angle and scaled operator intent value; and
 selectively controlling vehicle trajectory based on the output torque value.

2. The method of claim 1, wherein generating the output torque value based on the target handwheel angle and scaled operator intent value, includes generating the output torque value using a proportional integral derivative control loop.

3. The method of claim 1, wherein a difference between the output torque value and a torque value corresponding to the target handwheel angle increases as a difference between the target handwheel angle and the handwheel torque increases.

4. The method of claim 1, wherein a difference between the output torque value and a torque value corresponding to the target handwheel angle increases as the estimated handwheel pressure increases.

5. The method of claim 1, further comprising limiting the scaled operator intent value.

6. The method of claim 5, wherein limiting the scaled operator intent value includes limiting an integral term of the scaled operator intent value.

7. The method of claim 1, wherein generating the scaled operator intent is further based on vehicle trajectory information.

8. The method of claim 7, wherein the vehicle trajectory information includes at least one of a measured angle, a torque value, and a yaw value.

9. A blending steering control system comprising:
a processor; and
a memory including instructions that, when executed by the processor, cause the processor to:
estimate a handwheel pressure applied by an operator to a handwheel;
receive a handwheel torque input indicating a handwheel torque applied by the operator to the handwheel;
receive a target handwheel angle indicating a target handwheel angle of an electronic power steering system configured to control a corresponding vehicle along a defined path;
generate a scaled operator intent value based on the estimated handwheel pressure and the handwheel torque;
generate an output torque value based on the target handwheel angle and scaled operator intent value; and
selectively control vehicle trajectory based on the output torque value.

10. The system of claim 9, wherein the instructions further cause the processor to generate the output torque value using a proportional integral derivative control loop.

11. The system of claim 9, wherein a difference between the output torque value and a torque value corresponding to the target handwheel angle increases as a difference between the target handwheel angle and the handwheel torque increases.

12. The system of claim 9, wherein a difference between the output torque value and a torque value corresponding to the target handwheel angle increases as the estimated handwheel pressure increases.

13. The system of claim 9, wherein the instructions further cause the processor to limit the scaled operator intent value.

14. The system of claim 13, wherein the instructions further cause the processor to limit the scaled operator intent value by limiting an integral term of the scaled operator intent value.

15. The system of claim 9, wherein the instructions further cause the processor to generate the scaled operator intent further based on vehicle trajectory information.

16. The system of claim 15, wherein the vehicle trajectory information includes at least one of a measured angle, a torque value, and a yaw value.

17. An apparatus comprising:
a processor; and
a memory including instructions that, when executed by the processor, cause the processor to:
estimate a handwheel pressure applied by an operator to a handwheel;
receive a handwheel torque input indicating a handwheel torque applied by the operator to the handwheel;
generate a scaled handwheel torque based on a first scaling factor and the handwheel torque;
generate a scaled estimated handwheel pressure based on a second scaling factor and the estimated handwheel pressure;
receive a target handwheel angle indicating a target handwheel angle of an electronic power steering system configured to control a corresponding vehicle along a defined path;
generate a scaled operator intent value based on the scaled estimated handwheel pressure and the scaled handwheel torque;
generate an output torque value based on the target handwheel angle and scaled operator intent value; and
selectively control vehicle trajectory based on the output torque value.

18. The apparatus of claim 17, wherein the instructions further cause the processor to generate the output torque value using a proportional integral derivative control loop.

19. The apparatus of claim 17, wherein a difference between the output torque value and a torque value corresponding to the target handwheel angle increases as a difference between the target handwheel angle and the scaled handwheel torque increases.

20. The apparatus of claim 17, wherein a difference between the output torque value and a torque value corresponding to the target handwheel angle increases as the scaled estimated handwheel pressure increases.

* * * * *